(12) United States Patent
Park

(10) Patent No.: US 8,042,654 B2
(45) Date of Patent: Oct. 25, 2011

(54) DEVICE FOR SECURING AND LUBRICATING BUSHINGS

(75) Inventor: Patrick A. Park, Sandpoint, ID (US)

(73) Assignee: The Park Family Trust, Kootenai, ID (US)

( * ) Notice: Subject to any disclaimer, the term of this patent is extended or adjusted under 35 U.S.C. 154(b) by 962 days.

(21) Appl. No.: 11/690,695

(22) Filed: Mar. 23, 2007

(65) Prior Publication Data

US 2008/0230319 A1   Sep. 25, 2008

(51) Int. Cl.
*F16N 21/00* (2006.01)
*F16C 33/04* (2006.01)
(52) U.S. Cl. .................. 184/105.3; 184/5.1; 16/2.1
(58) Field of Classification Search ............ 184/5.1, 184/105.3; 384/322, 902; 141/85, 382, 383, 141/384, 386, 391; 16/2.1
See application file for complete search history.

(56) References Cited

U.S. PATENT DOCUMENTS

| | | | |
|---|---|---|---|
| 3,338,333 A * | 8/1967 | Wraase | 184/5.1 |
| 4,113,061 A * | 9/1978 | Peaster | 184/41 |
| 4,293,056 A * | 10/1981 | Setree, II | 184/5.1 |
| 5,094,548 A | 3/1992 | Danly, Sr. | |
| 5,459,993 A * | 10/1995 | Kuriyama et al. | 59/4 |
| 6,378,658 B1 * | 4/2002 | Kay | 184/105.2 |
| 2006/0257059 A1 | 11/2006 | Kubota | |

* cited by examiner

*Primary Examiner* — Michael Mansen
*Assistant Examiner* — Robert Reese
(74) *Attorney, Agent, or Firm* — Jay Schloff

(57) ABSTRACT

Disclosed is a device for securing and lubricating a bushing. The device comprises: a first member having a first body portion, a first engaging portion extending outwardly from the first body portion, and at least one channel drilled through a lateral outer surface of the first engaging portion and extending along a complete length of the body portion; and a second member having a second body portion and a second engaging portion disposed internally and along a longitudinal axis of the second body portion. The first engaging portion mounts a bushing covering at least a portion of an opening of the channel on the lateral outer surface and engages with the second engaging portion, thereby sandwiching the bushing between the first member and the second member. Pressurizing a lubricant through the channel transmits the lubricant to an inner surface of the bushing through the opening of the channel on the first engaging portion.

10 Claims, 4 Drawing Sheets

DEVICE FOR SECURING AND LUBRICATING BUSHINGS

FIELD OF THE INVENTION

The present invention relates to lubricating systems for bushings, and, more specifically, to devices for securing and lubricating bushings.

BACKGROUND OF THE INVENTION

In the automobile industry, the system that transmits mechanical power from an engine to an output device is referred to as the transmission. The operation of selecting the various gears in the transmission of an automobile may be manual, automatic or semi-automatic.

Generally, an engine has a flywheel with a bushing located centrally in the flywheel that is capable of receiving a pilot shaft of a transmission. The flywheel and the pilot shaft are configured and designed to have relative motion, and the bushing is configured to provide support between the flywheel and pilot shaft. More particularly, the function of the bushing is to reduce the frictional forces between the flywheel and the pilot shaft. Accordingly, for efficient functioning in the transmission, the bushing must be treated with a lubricant at the time of installation due to the inaccessibility of the bushing. Bushings are generally available as porous bushings or non-porous bushings. Bronze bushings are some of the most commonly-found porous bushings and have tiny air voids capable of receiving lubricant therein.

There are no standard methods available for lubricating a bronze bushing available in a hand tool form. Methods such as wiping a small amount of grease to an inner surface of the bronze bushing or dipping the bronze bushing in a container filled with the lubricant are commonly employed by technicians in the automobile industry such that the porous bronze bushing surface is lubricated but the porous bushing is not impregnated with the lubricant.

There have been some developments in the field of lubricating bronze bushings to improve the lubrication of such bushings. For example, U.S. Pat. No. 5,094,548 to Danly discloses a 'Composite and self-lubricating bushing' comprising a monolithic steel body having a machined internal cylindrical surface and a porous bearing layer applied to the surface. The steel body may also include a cavity for storing lubricant and at least one passageway extending between the cavity and the internal cylindrical surface. The bushing may be fabricated by positioning the steel body concentrically over an elastomeric plug, charging the annular cavity between the body and the plug with a sinterable particulate, expanding the elastomeric plug diametrically to compact the particulate, removing the plug and heating the bearing body and compacted particulate. The self-lubricating bushing of the Danly patent involves complex configuration of cavity and passages for storing and circulating the lubricant respectively. This requires sophisticated machining for manufacturing the self-lubricating bushing and therefore increases the cost involved in manufacturing the bushing.

U.S. Publication No. 20060257059 to Masaaki Kubota discloses 'Self-lubricating bushings, bearings and bearings assemblies' including lubricant inserts that have central axes that are aligned substantially parallel to the central axes of their respective bushings or bearings. The lubricant inserts present a side edge that is substantially flush with the corresponding bearing surface of the bushing or bearing. The exposed edges of the inserts can extend to the longitudinal edges of the bearing surface of the bushing or bearing. The self lubricating bushing of the Kubota publication contemplates sophisticated machining to make the lubricant insert.

The available art in the current domain have made an attempt to address the issue of lubricating a bushing by making structural modifications to the bushing. Such attempts are complex in nature and involve a high degree of technical skills to operate the same. Accordingly, there remains a need for a device capable of lubricating a bushing in a simple, efficient and cost effective manner without changing the structural configuration of the bushing.

SUMMARY OF THE INVENTION

In view of the foregoing disadvantages inherent in the prior art, the general purpose of the present invention is to provide a device for securing and lubricating bushings configured to include all the advantages of the prior art, and to overcome the drawbacks of the prior art.

In one aspect, the present invention provides a device for securing and lubricating a bushing. The device comprises: a first member and a second member. The first member has a first body portion, a first engaging portion extending externally and outwardly from the first body portion along a longitudinal axis of the first body portion, and at least one channel drilled through a lateral outer surface of the first engaging portion to the longitudinal axis and further extending along a complete length of the first body portion. The second member has a second body portion, and a second engaging portion disposed internally and along a longitudinal axis of the second body portion. The first engaging portion is capable of mounting a bushing; the second engaging portion is capable of coupling the first engaging portion with the bushing mounted thereon. The bushing is sandwiched between the first member and the second member in such a manner that the bushing covers at least a portion of an opening of the channel on the lateral outer surface of the first engaging portion and, by pressurizing a lubricant through the body portion along the channel of the first member, the lubricant is transmitted to an inner surface of the bushing through the opening of the channel on the first engaging portion.

In another aspect, the present invention provides a bushing lubricator. The bushing lubricator comprises a first elongated member and a second elongated member. The first elongated member comprises a first body portion having a first front end portion and a first rear end portion, a first flange extending perpendicularly and outwardly to a longitudinal axis of the first body portion and about the first front end portion, a first engaging portion extending outwardly from the first front end portion and along the longitudinal axis, and at least one channel drilled through a lateral outer surface of the first engaging portion to the longitudinal axis and extending to the first rear end portion of the first body portion, thereby configuring an opening at the lateral outer surface of the first engaging portion and at the first rear end portion. The second elongated member comprises a second body portion having a second front end portion and a second rear end portion, a second engaging portion disposed internally and extending along a longitudinal axis of the second body portion from the second front end portion to an intermediate position between the second front end portion and a second rear end portion, the second engaging portion thereby configuring a partial hollow second body portion, and a second flange extending perpendicularly and outwardly to the longitudinal axis and about the second front end portion. The first engaging portion is capable of mounting a bushing; the second engaging portion is capable of coupling the first engaging portion with the bushing mounted thereon in a manner such that the bushing is sandwiched between the first flange and the second flange. The bushing covers at least a portion of the opening of the channel on the lateral outer surface of the first engaging portion, and upon pressurizing a lubricant into the channel of the first elongated member through the opening at first rear end portion of the first body portion, the lubricant is transmitted to an inner surface of the bushing through the opening of the channel on the lateral outer surface of the first engaging portion.

In another aspect, the present invention provides a method of lubricating a bushing. The method comprises the steps of: configuring a first member having a first body portion, an elongated first engaging portion extending externally and outwardly from a first front end portion of the first body portion along a longitudinal axis, the first member further having at least one channel drilled through a lateral outer surface of the first engaging portion to the longitudinal axis and extending to a first rear end portion of the first body portion, and a first flange extending outwardly and perpendicularly to the central axis from the first front end portion; configuring a second member having a second body portion, an internally disposed second engaging portion extending along a central axis from a second front end portion to an intermediate position towards a second rear end portion of the second body portion and a second flange extending outwardly and perpendicularly from the second front end portion; inserting a first seal into the first engaging portion; inserting a bushing into the first engaging portion; inserting a second seal into the first engaging portion; coupling the first member to the second member by receiving the first engaging portion into the second engaging portion; tightening the engagement of the first engaging portion to the second engaging portion in a manner such that the bushing is sandwiched between the first seal and the second seal, the first seal is positioned adjacent to the first flange and the second seal is positioned adjacent to the second flange, and the bushing covers at least a portion of an opening of the channel on the lateral outer surface of the first engaging portion; pressurizing a lubricant into an opening of the channel at the first rear end portion of the first body portion; impregnating the bushing with the lubricant by transmitting the lubricant through the channel and injecting the lubricant to an inner surface of the bushing through the opening on the lateral outer surface of the first engaging portion; and continuing impregnating the bushing until an outer surface of the bushing starts seeping out the lubricant.

These together with other aspects of the present invention, along with the various features of novelty that characterize the invention, are pointed out with particularity in the claims annexed hereto and form a part of this disclosure. For a better understanding of the invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

The exemplary embodiments described herein detail for illustrative purposes are subject to many variations in structure and design. It should be emphasized, however, that the present invention is not limited to a particular device for securing and lubricating bushings, as shown and described. It is understood that various omissions, substitutions, and equivalents are contemplated as circumstances may suggest or render expedient, but it is intended to cover the application or implementation without departing from the spirit or scope of the claims of the present invention. The terms "a" and "an"herein do not denote a limitation of quantity, but rather denote the presence of at least one of the referenced item.

The present invention provides a device for securing and lubricating bushings. The bushings, as used herein, may find application in a plurality of domains, such as, but not limited to, mechanical applications (for example, the automobile industry), and electrical applications. The bushings act as a mechanical fixation between two possibly moving parts or at a position where one mechanical assembly is coupled to another. The present invention is a combination of two members, a first member and a second member, capable of securing a bushing and lubricating an inner surface of the bushing. The device of the present invention is useful for bushings wherein upon application of a lubricant to an inner surface of the bushing, the bushing absorbs the lubricant across the whole body of the bushing. More specifically, the device is useful for a porous bushing that absorbs the lubricant to the bushing's outer surface upon application of lubricant to the bushing's inner surface.

The present invention provides an easy-to-use device having substantially reduced configurational complexities for the purposes of securing and lubricating a bushing. The device may be comprehensively utilized in a variety of industries and, more specifically, in the automobile industry. The device of the present invention may be mass manufactured in a cost effective manner based on the dimensions of the particular bushings that will be lubricated.

Figure 1:
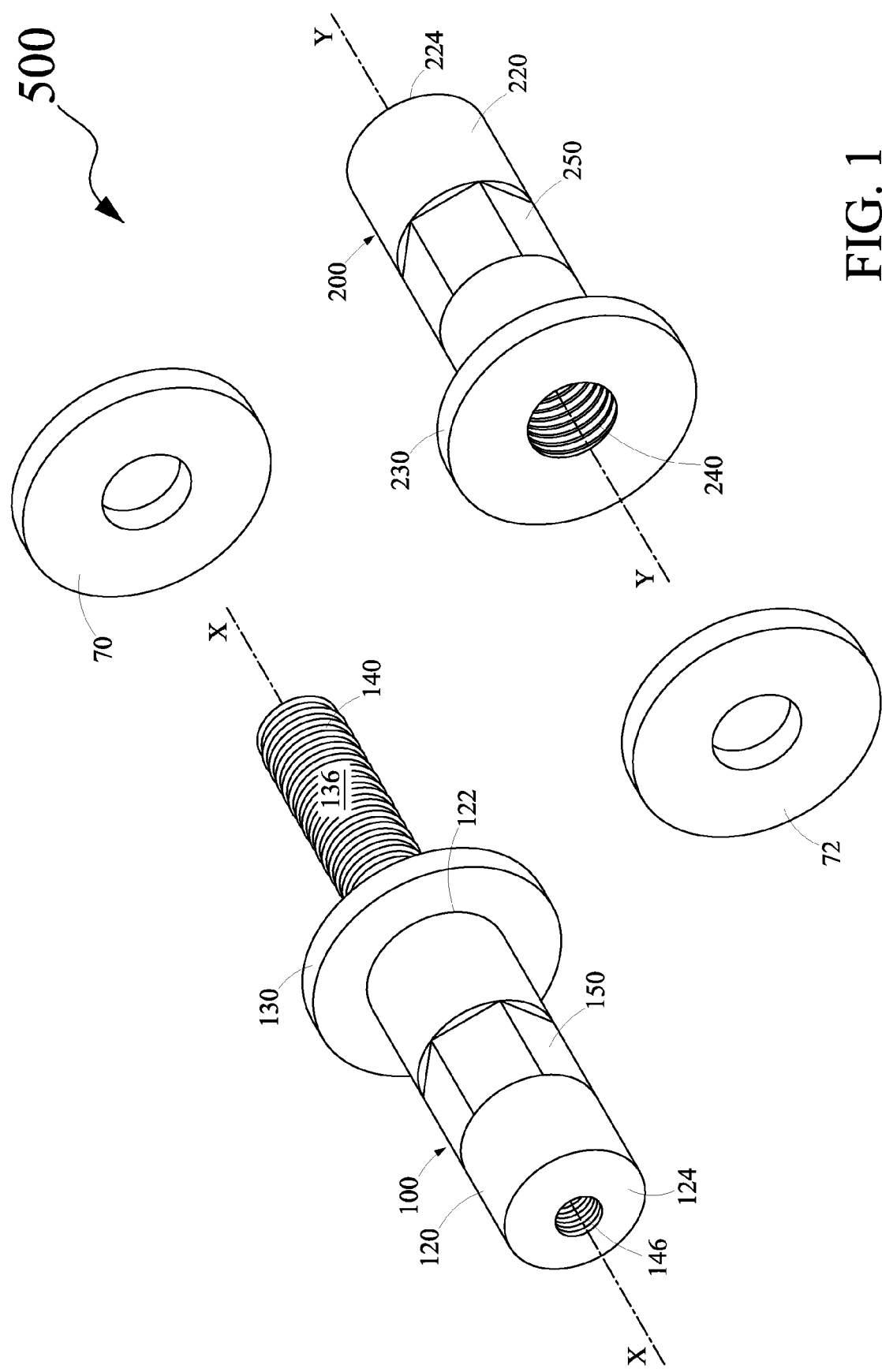
FIG. 1 is an exploded perspective view of the device 500 for securing and lubricating a bushing, according to an exemplary embodiment of the invention.
Figure 2A:
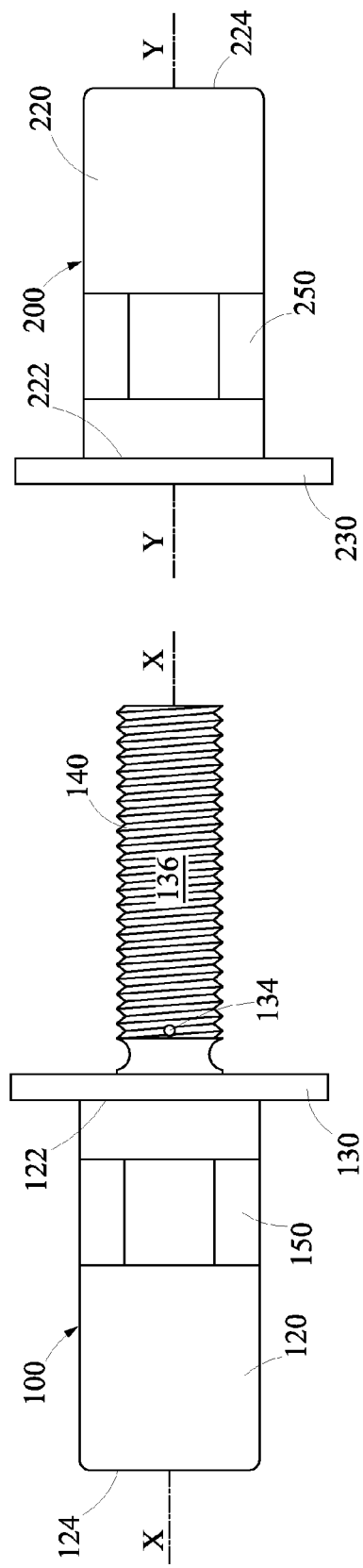
FIG. 2A is a side view of a first elongated member 100 and a second elongated member 200, according to an exemplary embodiment of the invention.
Figure 2B:
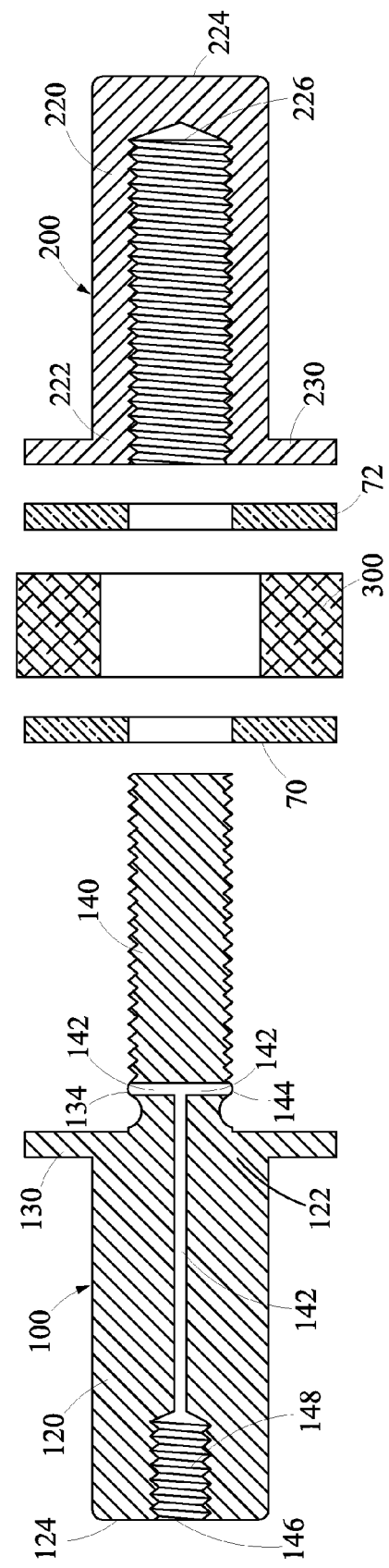
FIG. 2B is an cross-sectional exploded component view of the first elongated member 100, a first seal 70, a second seal 72, a bushing 300, and the second elongated member 200, according to an exemplary embodiment of the invention.

Referring to FIGS. 1, 2A and 2B, a device 500 for securing and lubricating a bushing 300, is shown. The device 500 is a combination of a first elongated member 100 and a second elongated member 200 configured in a manner, such that, the device 500 is capable of securing the bushing 300 by sandwiching the same between the first elongated member 100 and the second elongated member 200. The first elongated member 100 comprises: a first body portion 120 defining a first front end portion 122 and a first rear end portion 124; a first flange 130 extending about the first front end portion 122, and perpendicular to a longitudinal axis X-X of the first body portion 120; and a first engaging portion 140 extending outwardly from the first front end portion 122, and along the longitudinal axis X-X.

As shown in FIGS. 1, 2A and 2B, the first body portion 120 is configured in the form of a cylindrical elongated portion. Alternatively, the first body portion may be configured in other structural forms including, but not limited to, hexagonal, octagonal and polygonal forms. Also, as shown, the first engaging portion 140 is in the form of an elongated cylindrical structure having male threads; however, other structural forms are possible.

Additionally, the first elongated member 100 comprises at least one channel drilled through a lateral outer surface 136 of the first engaging portion 140 to the longitudinal axis X-X and further extending to the first rear end portion 124 of the first body portion 120. In one embodiment, the first engaging portion 140 comprises a channel 142 drilled through a lateral outer surface 136 of the first engaging portion 140 from diametrically opposite ends of the lateral outer surface 136 to the longitudinal axis X-X and further extending to the first rear end portion 124 of the first body portion 120. In this embodiment, the channel 142 has openings 134, 144 at the lateral outer surface 136 of the first engaging portion 140, and an opening 146 at the first rear end portion 124 of the first body portion 120. The channel 142 further has engagement features 148 towards the first rear end portion 124 of the first body portion 120. The engagement features include, but are not limited to, threaded sleeves, grooves, insert holes and the like. For example, as shown in FIG. 2B, the engagement features are female threads.

Furthermore, the first body portion 120 has clamping feature 150 on an outer surface of the first body portion 120. The clamping feature 150 enables the first body portion 120 to be held by a clamping device and aides in rotating the first body portion 20 clockwise or counterclockwise with respect to the longitudinal axis X-X. For example, the clamping features 150 may include knurls engraved on the outer surface of the first body portion 120.

Referring again to FIGS. 1, 2A and 2B, the second elongated member 200 comprises a second body portion 220 defining a second front end portion 222 and a second rear end portion 224; a second flange 230 extending about the second front end portion 222, and perpendicularly to a longitudinal axis Y-Y of the second body portion 220; and a second engaging portion 240 disposed internally and extending along the longitudinal axis Y-Y, from the second front end portion 222 to an intermediate position 226 between the second front end portion 222 and the second rear end portion 224. The second engaging portion 240 thereby configures a partially hollow second elongated member 200.

As envisioned, the first body portion 120 is configured in the form of a cylindrical elongated portion. Alternatively, other structures, including but not limited to hexagonal, octagonal and polygonal structures may also be configured. Also, as shown in FIG. 2B, the second engaging portion 240 has female threads complementary to the male threads of the first body portion 120 of the first elongated portion 100 (See FIG. 2B).

Additionally, the second body portion 220 has clamping feature 250 on an outer surface of the second body portion 220. The clamping feature 250 enables the second body portion 220 to be held by a clamping device and aides in rotating the second body portion 220 clockwise or counterclockwise with respect to the longitudinal axis Y-Y.

More specifically, referring to FIG. 2B, the cross-sectional exploded component view of the first elongated member 100, a first seal 70, a bushing 300, a second seal 72 and the second elongated member 200, are shown. The first seal 70 and the second seal 72 are configured in a manner such that the inner diameter of the seal is greater than an outer diameter of the first engaging portion 140. Due to the configuration, the first engaging portion 140 is capable of receiving the first seal 70 and the second seal 72 along the longitudinal axis X-X.

The bushing 300 generally comprises a ring-like structure with an inner diameter and an outer diameter and is capable of engaging to a shaft of a transmission line at the inner diameter. The first engaging portion 140 of the first elongated member 100 is configured in a manner such that the outer diameter of the first engaging portion 140 is lesser than the inner diameter of the bushing 300. Such a configuration enables the first elongated member 100 to receive the bushing 300 onto the first engaging portion 140 such that, when the bushing 300 is sandwiched between the first flange 130 and the first seal 70 on one side and the second flange 230 and the second seal 72 on the other side, the bushing 300 covers at least a portion of the openings 134 and 144 of the channel 142 on the lateral outer surface 136 of the first engaging portion 140.

Furthermore, the engagement features 148 of the channel 142 at the first rear end portion 124 of the first body portion 120 are capable of engaging to complementary engagement features of a lubricant injecting means 400, for example, a nipple connected to a lubricant storage device. Such an engagement enables an easy flow of the lubricant from a lubricant storage device to the channel 142 of the first elongated member 100.

The device 500 may be made from any material providing structural integrity to the device 500, while at the same time being non-porous, i.e. the material of the device 500 should not absorb the lubricant. Suitable materials for the device 500 include, but are not limited to, steel, stainless steel, copper, brass, aluminum, wood, and plastic.

Figure 3:
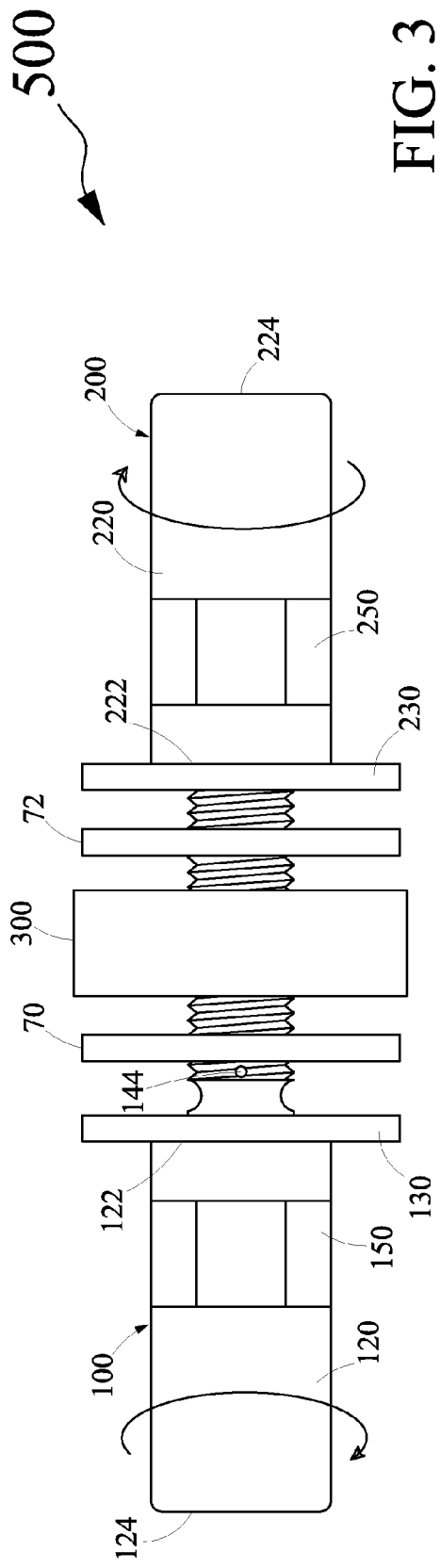
FIG. 3 is a side view of the device 500 in a partially assembled state with the bushing 300, according to an exemplary embodiment of the invention.
Figure 4:
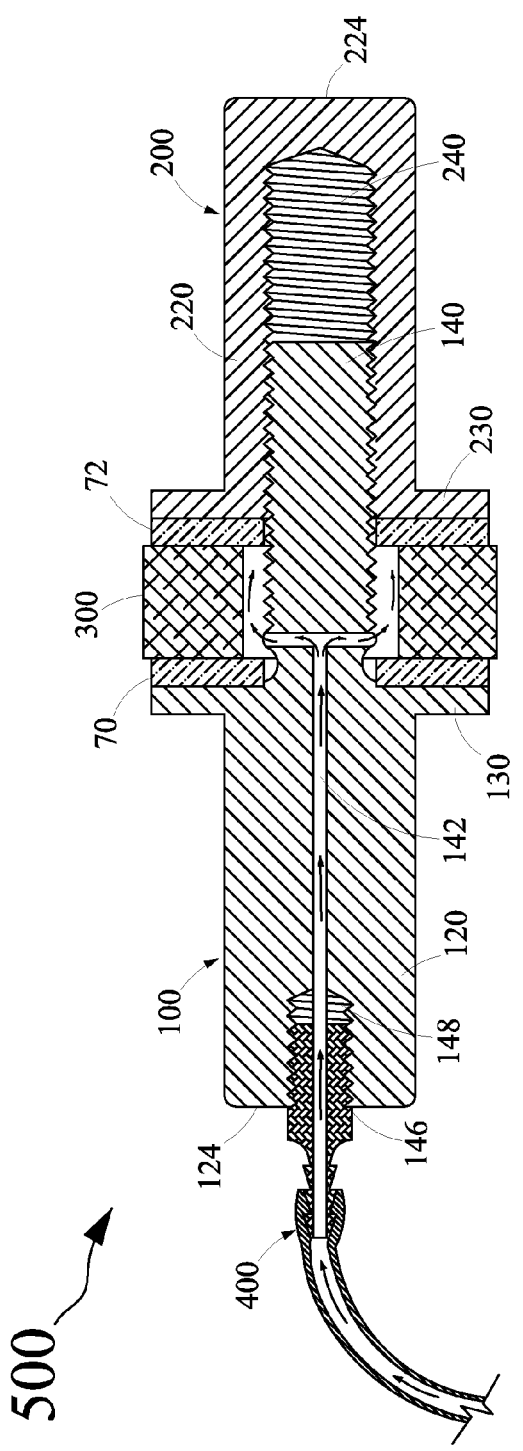
FIG. 4 is a cross-sectional view of the device 500 in an assembled and utilized state illustrating the flow of a lubricant to an inner surface of the bushing 300, according to an exemplary embodiment of the invention.
Figure 5:
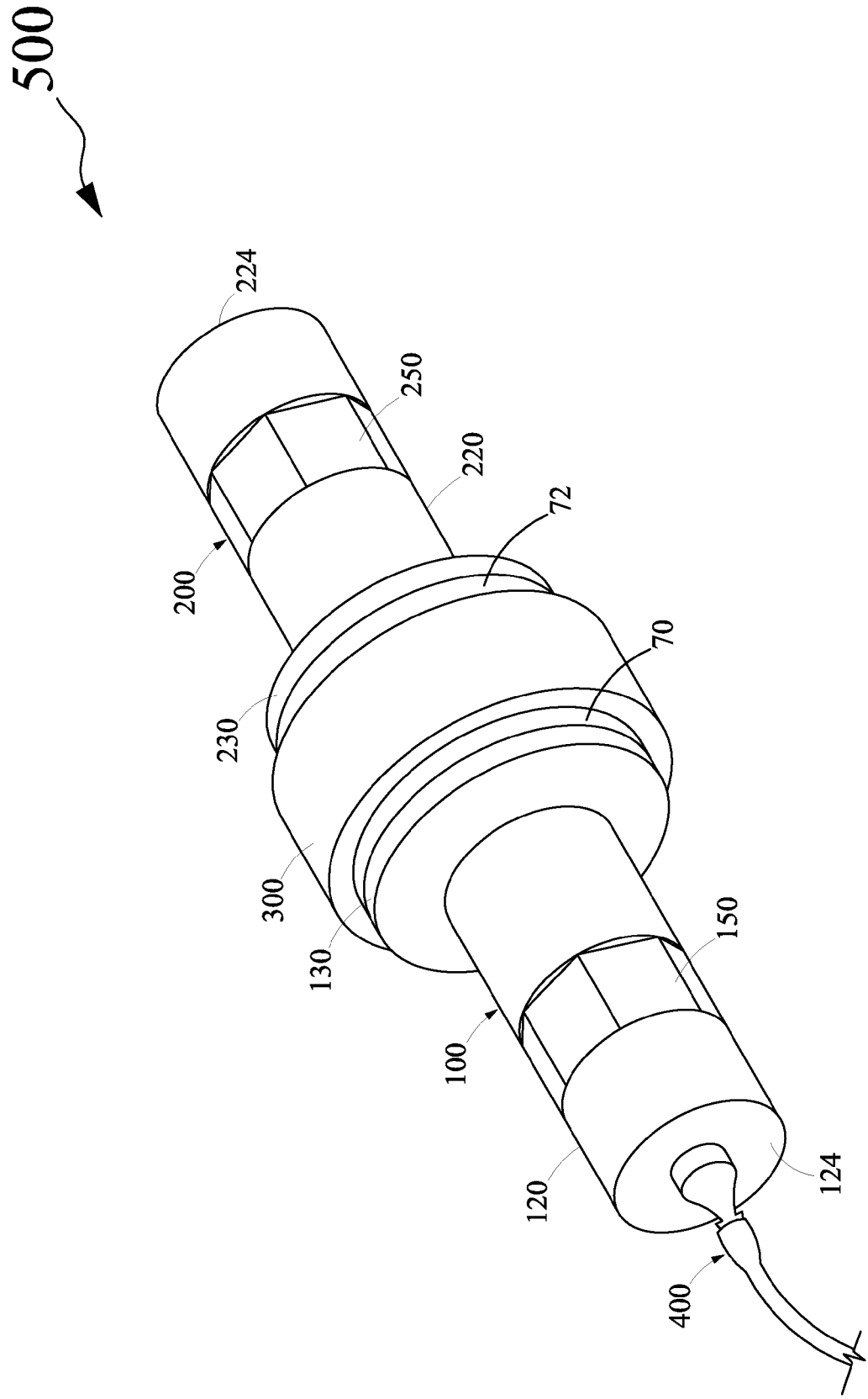
FIG. 5 is a perspective view of the device 500 in an assembled state with the busing 300, according to an exemplary embodiment of the invention.

Now, referring to FIGS. 3-5, illustrated is a method of lubricating the bushing 300 using the device 500 of the present invention. The method comprises inserting the first seal 70 into the first engaging portion 140 of the first elongated member 100. Next, inserting a bushing 300 into the first engaging portion 140 and subsequently inserting the second seal 72 into the first engaging portion 140. The first elongated member 100 is thereafter coupled to the second elongated member 200 by receiving the first engaging portion 140 into the second engaging portion 240. The coupling of the first engaging portion 140 to the second engaging portion 240 is tightened by rotating the first elongated member 100 clockwise and the second elongated member 200 counter clockwise or vice versa, in a manner, such that, the bushing 300 is sandwiched between the first seal 70 and the first flange 130 on one side and the second seal 72 and the second flange 230 on the other side. The bushing 300 covers at least a portion of the opening 144 of the channel 142 at the lateral surface of the first engaging portion 140.

Next, a lubricant is pressurized into the opening 146 of the channel 142 at the first rear end portion 124 of the first body portion 120 through the lubricant injecting means 400 of a lubricant storage device. The bushing 300 is impregnated with the lubricant by transmitting the lubricant through the channel 142 and injecting the lubricant to an inner surface of the bushing 300 through the opening 144 at the lateral outer surface 136 of the first engaging portion 140. The bushing 300 is continuously impregnated until the lubricant begins to seep out of the outer surface of the bushing 300, thereby indicating that the bushing 300 has been properly lubricated. The bushing 300 may be disassembled by rotating the first elongated member 100 clockwise and the second elongated member 200 counter clockwise or vice versa, such that, the first engaging portion 140 is disengaged from the second engaging portion 240. The second seal 72 is thereafter removed from the first engaging portion 140 so that the lubricated bushing 300 is removed and is available for installation to an engine transmission line.

The device 500 of the present invention may be advantageously used for lubricating bronze bushings having porous properties, i.e. the bronze bushings that are capable of absorbing lubricant into the tiny air voids when impregnated with lubricant on an inner surface of the bushing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is understood that various omissions, substitutions, and equivalents are contemplated as circumstances may suggest or render expedient, but it is intended to cover the application or implementation without departing from the spirit or scope of the claims of the present invention.

| Call Out List for Device for Securing and Lubricating Bushings | |
|---|---|
| 500 | device |
| 100 | first elongated member |
| 120 | first body portion |
| 122 | first front end portion |
| 124 | first rear end portion |
| 130 | first flange |
| 140 | first engaging portion |
| 136 | lateral outer surface of the first engaging portion |
| 142 | channel |
| 134, 144 | openings of the channel on the lateral outer surface |
| 146 | opening of the channel on the first rear end portion |
| 148 | engagement features in the channel towards the first rear end portion |
| 150 | clamping features on the first body portion |
| 70 | first seal |
| 72 | second seal |
| 200 | second elongated member |
| 220 | second body portion |
| 222 | second front end portion |
| 224 | second rear end portion |
| 226 | intermediate position |
| 230 | second flange |
| 240 | second engaging portion |
| 250 | clamping features on the second body portion |
| 300 | bushing |
| 400 | lubricant injecting means |

What is claimed is:

1. A bushing lubricator comprising:
a first elongated member comprising
a first body portion having a first front end portion and a first rear end portion,
a first flange extending perpendicularly and outwardly to a longitudinal axis of the first body portion and about the first front end portion,
a first engaging portion extending outwardly from the first front end portion and along the longitudinal axis, the first engaging portion comprising a cylindrical threaded portion, and
at least one channel drilled through a lateral outer surface of the first engaging portion to the longitudinal axis and extending to the first rear end portion of the first rear end portion, thereby configuring an opening at the lateral outer surface of the first engaging portion and at the first rear end portion; and
a second elongated member comprising
a second body portion having a second front end portion and a second rear end portion,
a second engaging portion disposed internally and extending along a longitudinal axis of the second body portion from the second front end portion to an intermediate position between the second front end portion and a second rear end portion, the second engaging portion thereby configuring a partial hollow second body portion, the second engaging portion further comprising a complementary threaded portion capable of complementarily engaging the first threaded portion, and
a second flange extending perpendicularly and outwardly to the longitudinal axis and about the second front end portion,
wherein the first engaging portion is capable of removably mounting a bushing, the second engaging portion is capable of removably coupling the first engaging portion with the bushing mounted thereon in a manner, such that, the bushing is sandwiched between the first flange and the second flange, and
wherein the bushing covers at least a portion of the opening of the channel on the lateral outer surface of the first engaging portion; and
wherein upon pressurizing a lubricant into the channel of the first elongated member through the opening at first rear end portion of the first body portion, the lubricant is transmitted to an inner surface of the bushing through the opening of the channel on the lateral outer surface of the first engaging portion.

2. The bushing lubricator of claim 1, wherein the cylindrical threaded portion has male threads and the complementary threaded portion has female threads.

3. The bushing lubricator of claim 1, wherein the cylindrical threaded portion has an outer diameter smaller than an inner diameter of the bushing for mounting the bushing on the cylindrical threaded portion.

4. The bushing lubricator of claim 1, wherein the first body portion and the second body portion have clamping features for holding and rotating the first body portion and the second body portion relative to each other clockwise or counterclockwise.

5. A device for securing and lubricating a bushing, comprising:
a first member having
a first body portion,
a first engaging portion extending externally and outwardly from the first body portion along a longitudinal axis of the first body portion, and
at least one channel drilled through a lateral outer surface of the first engaging portion to the longitudinal axis and further extending along a complete length of the first body portion; and
a second member having
a second body portion, and
a second engaging portion disposed internally and along a longitudinal axis of the second body portion;
wherein the first engaging portion is capable of removably mounting a bushing, the second engaging portion is capable of removably coupling the first engaging portion, with the bushing removably mounted thereon; and wherein the bushing is sandwiched between the first member and the second member, in a manner such that the bushing covers at least a portion of an opening of the channel on the lateral outer surface of the first engaging portion and such that the bushing and first body portion and the bushing and second body portion are disposed against one another; and wherein upon pressurizing a lubricant through the body portion along the channel of the first member, the lubricant is transmitted to an inner surface of the bushing through the opening of the channel on the first engaging portion, and wherein the lubricant is pressurized sufficiently such that the lubricant impregnates the bushing to saturation.

6. The bushing lubricator of claim 5, wherein the drilled channel at the first rear end portion of the first body portion has engagement features for engaging the complementary engagement features of a lubricant injecting means.

7. The bushing lubricator of claim 5, further comprising a pair of seals capable of being mounted on the first engaging portion in a manner, such that, when the bushing is sandwiched between the first flange and the second flange, the first seal is positioned between the bushing and the first flange and the second seal is positioned between the bushing and the second flange.

8. A bushing lubricator comprising:
a first elongated member comprising
   a first body portion having a first front end portion and a first rear end portion,
   a first flange extending perpendicularly and outwardly to a longitudinal axis of the first body portion and about the first front end portion,
   a first engaging portion extending outwardly from the first front end portion and along the longitudinal axis, and
   at least one channel drilled through a lateral outer surface of the first engaging portion to the longitudinal axis and extending to the first rear end portion of the first body portion, thereby configuring an opening at the lateral outer surface of the first engaging portion and at the first rear end portion; and
a second elongated member comprising
   a second body portion having a second front end portion and a second rear end portion,
   a second engaging portion disposed internally and extending along a longitudinal axis of the second body portion from the second front end portion to an intermediate position between the second front end portion and a second rear end portion, the second engaging portion thereby configuring a partial hollow second body portion, and
   a second flange extending perpendicularly and outwardly to the longitudinal axis and about the second front end portion,
wherein the first engaging portion is capable of removably mounting a bushing, the second engaging portion is capable of removably coupling the first engaging portion with the bushing mounted thereon in a manner, such that, the bushing is sandwiched between the first flange and the second flange and such that the bushing and first body portion and the bushing and second body portion are disposed against one another; and
wherein the bushing covers at least a portion of the opening of the channel on the lateral outer surface of the first engaging portion; and
wherein upon pressurizing a lubricant into the channel of the first elongated member through the opening at first rear end portion of the first body portion, the lubricant is transmitted to an inner surface of the bushing through the opening of the channel on the lateral outer surface of the first engaging portion, and wherein the lubricant is pressurized sufficiently such that the lubricant impregnates the bushing to saturation.

9. The bushing lubricator of claim 8, wherein the drilled channel at the first rear end portion of the first body portion has engagement features for engaging the complementary engagement features of a lubricant injecting means.

10. The bushing lubricator of claim 8, further comprising a pair of seals capable of being mounted on the first engaging portion in a manner, such that, when the bushing is sandwiched between the first flange and the second flange, the first seal is positioned between the bushing and the first flange and the second seal is positioned between the bushing and the second flange.

* * * * *